UNITED STATES PATENT OFFICE.

JEAN HUBERT LOUIS DE BATS, OF ZELIENOPLE, PENNSYLVANIA, ASSIGNOR, BY MESNE ASSIGNMENTS, TO LAVA CRUCIBLE COMPANY OF PITTSBURGH, OF PITTSBURGH, PENNSYLVANIA, A CORPORATION OF PENNSYLVANIA.

METHOD OF MAKING CLAY AND GRAPHITE CRUCIBLES.

1,374,910.  Specification of Letters Patent.  Patented Apr. 19, 1921.

No Drawing. Application filed May 31, 1918, Serial No. 237,502. Renewed August 5, 1920. Serial No. 401,564.

*To all whom it may concern:*

Be it known that I, JEAN HUBERT LOUIS DE BATS, a resident of Zelienople, in the county of Butler and State of Pennsylvania, have invented a new and useful Improvement in Methods of Making Clay and Graphite Crucibles, of which the following is a specification.

This invention relates to the manufacture of ceramic products which contain clay, graphite, carbid of silica; or clay, graphite, sand, carbid of silica, lime, magnesia, bauxite, or zirconia, and particularly to articles to be used in the building and manufacturing arts. As an example, I will describe my invention as applied to crucibles or pots for use in melting iron, steel, copper, brass and other metals, glass or other similar substances, and to the method of making the same. The object of the invention is to provide a ceramic article, such, for instance, as a crucible or pot which is of superior quality and has a longer life than such articles as heretofore made, and also one which can be produced in a much less period of time, with less labor, and more cheaply than with processes heretofore used.

Crucibles or pots such as used in the manufacture of crucible steel or for melting other ferrous or non-ferrous metals, or glass, have heretofore been formed of clay or clay mixed with graphite, with or without the admixture of sand thereto. In the manufacture of such crucibles or pots, after the same are molded, they must be dried very slowly and for a long period of time, for six or more weeks, before they can be burned. It has been found that if it is attempted to dry them more rapidly, some of the moisture becomes entrapped in the body of the crucibles or pots, and when said pots are subjected to the high temperature of burning and the high temperature of the furnaces in which they are used, this moisture expands and produces cracks or flaws in the walls of the crucibles or pots, which leads to their early destruction. Heretofore, it has not been found impractical to manufacture such articles except by the very slow, long continued drying process, which has resulted in a considerable additional cost due to the labor in handling the pots, and also in the space required for drying floors.

I have discovered that when a small amount of chemical elements in a metallic state, i. e. aluminum or magnesium, or mixtures or alloys of the same, such, for instance, as ferro-aluminum, in a finely divided state, is added to the clay, or to the clay and graphite, and thoroughly mixed with the same, before molding the pots, such pots can be burnt very shortly after they are molded without producing the detrimental results above described, as a result of which the manufacture is greatly expedited and the cost of handling and storing the crucibles or pots while drying is greatly reduced.

I have further discovered that by the employment of chemical elements in a metallic state, such, for example, as the metallic elements herein referred to, the ware is dried from within, due to the chemical action produced, and that I thereby produce a structure that is evenly shrunk or set, and one in which the density is substantially uniform throughout—a structure having a considerable greater density than those heretofore produced and possessing greater wearing qualities.

In manufacturing articles according to my method the clay, or the clay and graphite either with or without sand added thereto, is prepared and mixed in the usual way, but has added thereto a small amount of metallic aluminum or magnesium, or mixtures or alloys of the same, in a finely divided state, such as in the so-called "grained" form, or in the form of powder or dust. This is added to the clay, or clay and graphite, prior to mixing, and is uniformly and thoroughly mixed therewith. When thoroughly mixed the crucibles or pots or other articles are formed or molded therefrom in the usual way, and can then either be immediately taken to the firing kiln, or can be subjected to a short rapid drying, such as in a suitable drying oven. When burnt in the kiln, the moisture is driven out of the same without producing cracks or flaws and leaving a crucible or other article which has been found to have even greater strength and greater wearing qualities than articles of this character manufactured according to old processes.

The amount of powdered aluminum or magnesium to be added to the mixture will depend upon the use to which the crucible or pot is to be put and the degree of fineness of the added metal. For melting steel and the like, a smaller quantity is necessary than for melting brass or other non-ferrous metals which melt at a lower temperature. Furthermore, the finer the condition of the powdered aluminum or magnesium, the smaller the amount that can be used as it will distribute more uniformly throughout the mass. I have found that as low as one per cent. (1%) of such powdered metals will produce the desired results for crucibles or pots for melting brass or non-ferrous metals, and that as high as ten per cent. (10%) or even more is permissible.

The action of the powdered aluminum or magnesium in the mass is not thoroughly understood, but is probably due to the heat produced by the chemical action between the metal and water. By the expression aluminum-magnesium group employed in the claims I mean metals which react like aluminum or magnesium or alloys thereof.

When it is desired that graphite crucibles or pots shall have an enduring glaze, the mixture will also have incorporated therein a non-ferrous metal, such as copper, nickel, or Monell metal (which consists both of copper and nickel), chromium, cobalt, or the like, as more fully described in my application of even date herewith, Serial No. 237,503.

The process is applicable for making crucibles or pots formed entirely of clay, such as used largely in the glass industry, or pots or crucibles formed of clay and graphite, such as are largely used in the steel and metal industries. The process is not only more economical than processes heretofore used, but also enables the production of larger quantities of crucibles or pots under rush orders.

What I claim is:—

1. The method of making crucibles or pots containing clay, which consists in mixing metal of the aluminum-magnesium group in a finely divided form with the material from which the crucible or pot is formed, and molding the same, whereby said crucibles or pots may be burned shortly after molding.

2. The method of making crucibles or pots containing clay and graphite, which consists in mixing with the plastic material from which the crucibles or pots are formed, metal of the aluminum-magnesium group in a finely divided form, and molding the same, whereby said crucibles or pots may be burned shortly after molding.

3. The method of making crucibles or pots containing clay, which consists in mixing with the plastic material from which the same are formed, aluminum-containing metal in a finely divided form, and molding the same, whereby said crucibles or pots can be quickly dried and burned.

4. The method of making crucibles or pots containing clay and graphite, which consists in mixing with the material from which the same are formed, aluminum-containing metal in a finely divided form, and molding the same, whereby said crucibles or pots can be quickly dried and burned.

5. A crucible or pot containing clay and having incorporated therein metal of the aluminum-magnesium group in a finely divided form.

6. A crucible or pot containing clay and graphite and having incorporated therein metal of the aluminum-magnesium group in a finely divided form.

7. The method of making a product suitable for making crucibles or pots, which consists in mixing metal of the aluminum-magnesium group in a finely divided form with the material from which the crucible or pot is to be formed.

8. The method of making a product suitable for making crucibles or pots, which consists in mixing aluminum in a metallic state and in a finely divided form with the material from which the article is to be formed.

9. A material suitable for making crucibles or pots comprising clay and having incorporated therein metal of the aluminum-magnesium group in a finely divided form.

10. A material suitable for making crucibles or pots comprising clay and graphite and having incorporated therein metal of the aluminum-magnesium group in a finely divided form.

In testimony whereof, I have hereunto set my hand.

JEAN HUBERT LOUIS DE BATS.

Witness:
G. H. LERESCHE.